United States Patent
Choi et al.

(10) Patent No.: US 9,207,311 B2
(45) Date of Patent: Dec. 8, 2015

(54) RADAR APPARATUS

(71) Applicant: MANDO CORPORATION, Gyeonggi-do (KR)

(72) Inventors: Seung Un Choi, Gyeonggi-do (KR); Min Seok Kim, Gyeonggi-do (KR); Seong Hee Jeong, Gyeonggi-do (KR); Jae Eun Lee, Gyeonggi-do (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 323 days.

(21) Appl. No.: 13/784,619

(22) Filed: Mar. 4, 2013

(65) Prior Publication Data

US 2013/0249732 A1 Sep. 26, 2013

(30) Foreign Application Priority Data

Mar. 8, 2012 (KR) .................. 10-2012-0023869

(51) Int. Cl.
*G01S 7/02* (2006.01)
*G01S 7/03* (2006.01)
*G01S 13/02* (2006.01)
*G01S 13/00* (2006.01)
*G01S 13/93* (2006.01)
*H01Q 1/32* (2006.01)
*H01Q 21/28* (2006.01)

(52) U.S. Cl.
CPC .............. *G01S 13/00* (2013.01); *G01S 7/032* (2013.01); *G01S 13/931* (2013.01); *G01S 2007/027* (2013.01); *H01Q 1/3233* (2013.01); *H01Q 21/28* (2013.01)

(58) Field of Classification Search
CPC .............. G01S 7/02; G01S 7/03; G01S 7/032; G01S 2007/027; G01S 2007/028; G01S 13/00; G01S 13/88; G01S 13/93; G01S 13/931; H01Q 1/27; H01Q 1/32; H01Q 1/3208; H01Q 1/3233; H01Q 21/28
USPC ......... 342/82, 89, 175, 70, 165; 343/700 MS, 343/700 R, 702
See application file for complete search history.

(56) References Cited

U.S. PATENT DOCUMENTS

| | | | | |
|---|---|---|---|---|
| 4,259,743 A * | 3/1981 | Kaneko et al. | ................. | 342/175 |
| 4,851,855 A * | 7/1989 | Tsukamoto et al. | ... | 343/700 MS |
| 5,717,400 A * | 2/1998 | Uematsu et al. | .............. | 342/165 |
| 5,764,189 A * | 6/1998 | Lohninger | ............. | 343/700 MS |
| 6,501,415 B1 * | 12/2002 | Viana et al. | ..................... | 342/175 |
| 6,759,987 B2 * | 7/2004 | Schmidt et al. | ........ | 343/700 MS |
| 7,109,922 B2 * | 9/2006 | Shmuel | .................. | 343/700 MS |
| 7,180,440 B2 * | 2/2007 | Schmidt et al. | ............... | 342/175 |
| 7,227,495 B2 * | 6/2007 | Bletz et al. | ..................... | 342/175 |
| 7,482,972 B2 * | 1/2009 | Forstner et al. | ................ | 342/175 |
| 7,603,097 B2 * | 10/2009 | Leblanc et al. | ................. | 342/70 |
| 7,733,265 B2 * | 6/2010 | Margomenos et al. | ......... | 342/70 |

(Continued)

FOREIGN PATENT DOCUMENTS

| | | | | |
|---|---|---|---|---|
| CN | 102288971 A | 12/2011 | | |
| EP | 0 978 729 A2 | 2/2000 | | |
| EP | 2219045 A1 * | 8/2010 | .............. | H01Q 1/12 |
| JP | 06-300834 A1 | 10/1994 | | |
| JP | 2782053 B2 | 7/1998 | | |

(Continued)

*Primary Examiner* — Bernarr Gregory
(74) *Attorney, Agent, or Firm* — McDermott Will & Emery LLP (57) ABSTRACT

The present invention relates to a radar apparatus. More particularly, the present invention is a radar apparatus having a front end structure that is reduced in size and the number of parts.

11 Claims, 7 Drawing Sheets

(56) References Cited

U.S. PATENT DOCUMENTS

| | | | |
|---|---|---|---|
| 7,864,120 B2* | 1/2011 | Dou et al. | 343/702 |
| 8,044,868 B2* | 10/2011 | Ko et al. | 343/700 MS |
| 8,179,306 B2* | 5/2012 | Sasaki et al. | 342/175 |
| 2008/0117097 A1* | 5/2008 | Walter et al. | 342/175 |

FOREIGN PATENT DOCUMENTS

| | | | | |
|---|---|---|---|---|
| JP | 2000-059140 A | 2/2000 | | |
| JP | 2010-139258 A | 6/2010 | | |
| KR | 10-1052041 B1 | 7/2011 | | |
| WO | WO2005/107012 A1 * | 11/2005 | | H01Q 9/04 |

* cited by examiner

RADAR APPARATUS

CROSS-REFERENCE TO RELATED APPLICATION

This application claims priority from and the benefit under 35 U.S.C. §119(a) of Korean Patent Application No. 10-2012-0023869, filed on Mar. 8, 2012 which is hereby incorporated by reference for all purposes as if fully set forth herein.

BACKGROUND OF THE INVENTION

1. Field of the invention

The present invention relates to a radar apparatus.

2. Description of the Prior Art

Vehicle radar technologies for implementing an advanced vehicle safety system for protecting humans' lives and properties are increased in the applicability thereof from a front side to a rear side of a vehicle day by day.

Radar systems for implementing such an application use superhigh frequency bands of 24 GHz and 77 GHz as sensing signals. Recently, for the purpose of beam-forming for improving angular resolution, it is essential to arrange a plurality of reception channels in a transmission/reception unit circuit configuration, and occasionally, a plurality of transmission units and a plurality of reception units are applied in order to reduce the number of reception channels.

The number of antennas and the channels of the transmission/reception unit for satisfying such requirements should unavoidably be increased. Accordingly, there is a problem in that the complexity of a transmission/reception circuit unit and a radar size should be increased.

For this reason, in order to reduce the radar size and to improve the EMI/EMC performance of a superhigh frequency circuit unit, a conventional radar apparatus is configured such that a superhigh frequency substrate and a radar are arranged on one side, and a superhigh frequency substrate and a superhigh frequency transmission/reception circuit is arranged on the other side.

However, such a conventional configuration necessarily requires a transition circuit to convert an electric signal between the antenna and the transmission/reception unit circuit into a radio signal and a waveguide for transmitting the radio signal, which causes a problem of deteriorating a yield and performance in addition to a problem of increasing the size of the radar apparatus.

SUMMARY OF THE INVENTION

Accordingly, the present invention has been made to solve the above-mentioned problems occurring in the prior art, and an object of the present invention is to provide a radar apparatus having a front end structure which is small in size and has a reduced number of parts.

Another object of the present invention is to provide a radar apparatus having a front end structure such that the yield and performance of the radar apparatus are not deteriorated.

In order to accomplish this object, there is provided a radar apparatus including: a radar antenna unit including a transmission antenna unit and a reception antenna unit; and a front end printed circuit board, on which a signal transmission/reception unit is mounted. The signal transmission/reception unit is configured to transmit a signal through the transmission antenna and to receive the transmitted signal through the reception antenna when the transmitted signal is reflected from surroundings. The radar apparatus has a front end structure in which the radar antenna unit and the signal transmission/reception unit are both arranged and mounted on the top side of the front end printed circuit board.

The radar antenna unit and the signal transmission/reception unit may be both arranged on the top side of the front end printed circuit board and connected with each other through a micro-strip line or by wire-bonding.

The signal transmission/reception unit mounted on the top side of the front end printed circuit board may be implemented as a single reception/transmission integrated circuit chip.

The signal transmission/reception unit mounted on the top side of the front end printed circuit board may be separately implemented as one or more transmission integrated circuit chips and one or more reception integrated circuit chips.

The radar apparatus may further include a protective member configured to cover the signal transmission/reception unit and coupled to the front end printed circuit board to protect the signal transmission/reception unit mounted on the top side of the front end printed circuit board.

The protective member may be formed with a groove that serves as a passage of a micro-strip line or a wire for connecting the radar antenna unit and the signal transmission/reception unit mounted on the front end printed circuit board.

The top side of the front end printed circuit board may include a radar antenna mounting part where the radar antenna unit is mounted, and a transmission/reception circuit mounting part where the transmission/reception circuit unit is mounted. The protective member may be sized not to cover the radar antenna mounting part.

The radar apparatus may further include a base band circuit board mounted on the bottom side of the front end printed circuit board to perform a transmission/reception control and an analog signal to digital signal conversion.

The radar apparatus may further include: a signal processing printed circuit board on which a signal processing circuit unit is mounted, and a base plate having a top side coupled to the bottom side of the front end printed circuit board, and a bottom side coupled to the top side of the signal processing printed circuit board.

The signal transmission/reception unit may be mounted on the top side of the front end printed circuit board and seated on the top side of the front end printed circuit board, or mounted on the top side of the front end printed circuit board and seated on the top side of the base plate through one or more holes formed in the front end printed circuit board.

The base plate may be formed with one or more protrusions on the top side thereof to allow the signal transmission/reception unit to be seated on and assembled to the base plate when the signal transmission/reception unit is seated on the top side of the base plate.

The radar antenna unit mounted on the top side of the front end printed circuit board may include the transmission antenna unit implemented by a plurality of transmission array antennas and one or more short-distance transmission array antennas, and the reception antenna unit implemented by a plurality of reception array antenna.

The radar apparatus further includes a power divider that is controlled to supply high power to the long-distance transmission array antenna arranged at the center of the plurality of transmission array antennas, and supply power to the other long-distance transmission array antennas in such a manner that the power is reduced as approaching the long-distance transmission array antennas of the opposite sides.

As described above, according to the present invention, it is possible to provide a radar apparatus 100 having a front end structure which is reduced in size and the number of parts.

In addition, according to the present invention, it is possible to provide a radar apparatus having a front end structure that suppresses the deterioration of the yield and performance of the radar apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
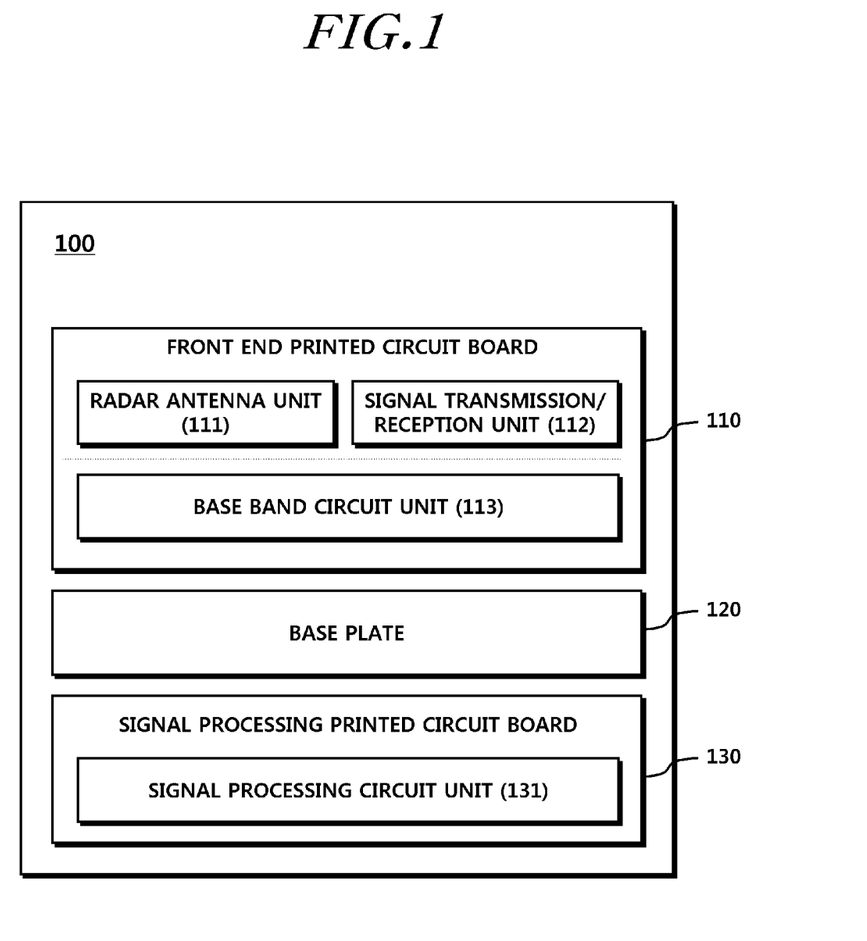
FIG. 1 is a block diagram for a radar apparatus according to an exemplary embodiment of the present invention.

FIG. 1 is a block diagram for a radar apparatus 100 according to an exemplary embodiment of the present invention.

Referring to FIG. 1, the radar apparatus 100 according to an exemplary embodiment of the present invention may include a radar antenna unit 111 and a front end printed circuit board 110 on which a signal transmission/reception unit 112 is mounted.

The radar antenna unit 111 includes a transmission antenna unit from which a signal for sensing surroundings is transmitted, and a reception antenna unit to which the transmitted signal is received when the transmitted signal is reflected from the surroundings.

The signal transmission/reception unit 112 is configured to transmit a signal for sensing surroundings through the transmission antenna, and to receive the transmitted signal through the reception antenna when the transmitted signal is reflected from the surroundings.

The radar antenna unit 111 and the signal transmission/reception unit 112 are mounted on the front end printed circuit board 110, in which the radar antenna unit 111 and the signal transmission/reception unit 112 may be both arranged on the top side of the front end printed circuit board 110 to provide a front end structure.

That is, the radar apparatus 100 according to the present exemplary embodiment may have a front end structure, in which the radar antenna unit 111 and the signal transmission/reception unit 112 are both arranged on the same plane of the front end printed circuit board 110.

The radar antenna unit 111 and the signal transmission/reception unit 112 are both arranged and mounted on the top side of the front end printed circuit board 110, in which radar antenna unit 111 and signal transmission/reception unit 112 may be connected through a micro-strip line or by wire bonding.

The signal transmission/reception unit 112 mounted on the top side of the front end printed circuit board 110 may be implemented as a circuit that is constituted by a plurality of circuit devices. However, the signal transmission/reception unit 112 may be implemented as a single integrated circuit chip or two or more integrated circuit chips in order to ensure that the radar antenna unit 111 and the signal transmission/reception unit 112 are arranged on the same plane of the front end printed circuit board 110.

If the signal transmission/reception unit 112 is implemented as a single integrated circuit chip or two or more integrated circuit chips, the signal transmission/reception unit 112 may be implemented as a single reception/transmission integrated circuit chip, or as one or more transmission integrated circuit chips and one or more reception integrated circuit chips which are separated from each other.

Meanwhile, in the radar apparatus 100 according to the present exemplary embodiment, a base band circuit board 113 configured to perform a transmission/reception control and to perform an analog to digital conversion may be mounted on the bottom side of the front end printed circuit board 110 as illustrated in FIG. 1.

As illustrated in FIG. 1, the radar apparatus 100 according to the present exemplary embodiment may further include a signal processing printed circuit board 130 on which a signal processing circuit unit 131 is mounted, and a base plate 120, of which the top side is coupled to the bottom side of the front end printed circuit board 110, and the bottom side is coupled to the top side of the signal processing printed circuit board 130. Here, the base plate 120 is a mechanical structure for assembling the components included in the radar apparatus 100 thereto.

Figure 2:
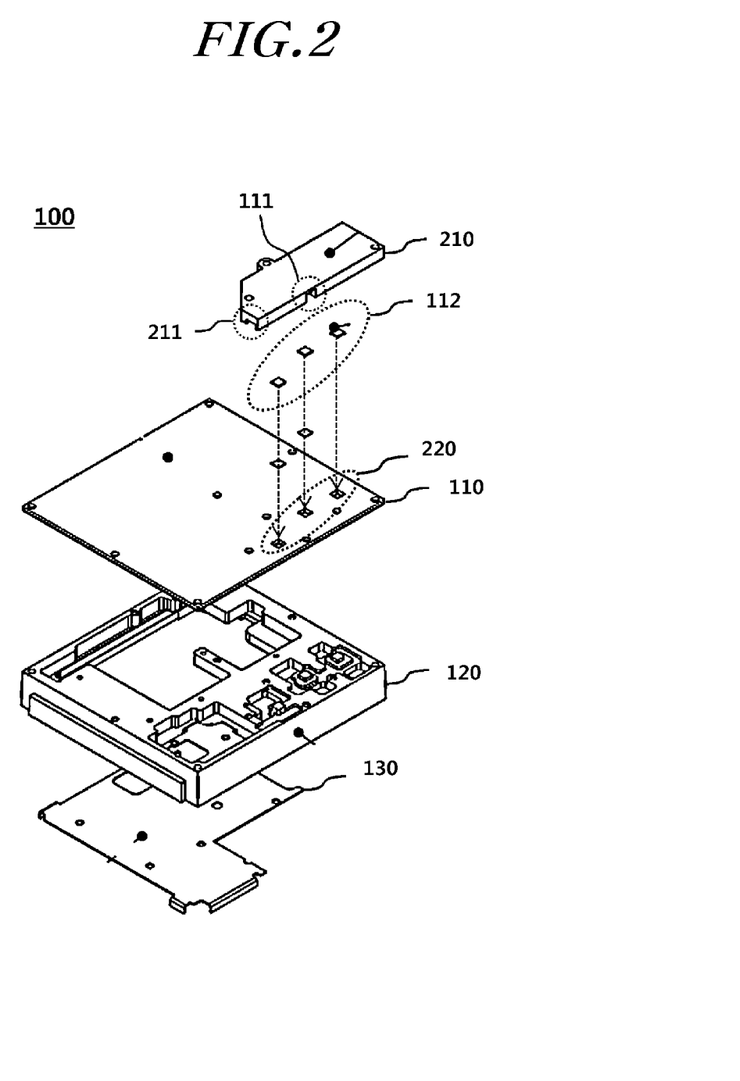
FIG. 2 is an exploded perspective view of the radar apparatus according to an exemplary embodiment of the present invention.
Figure 3:
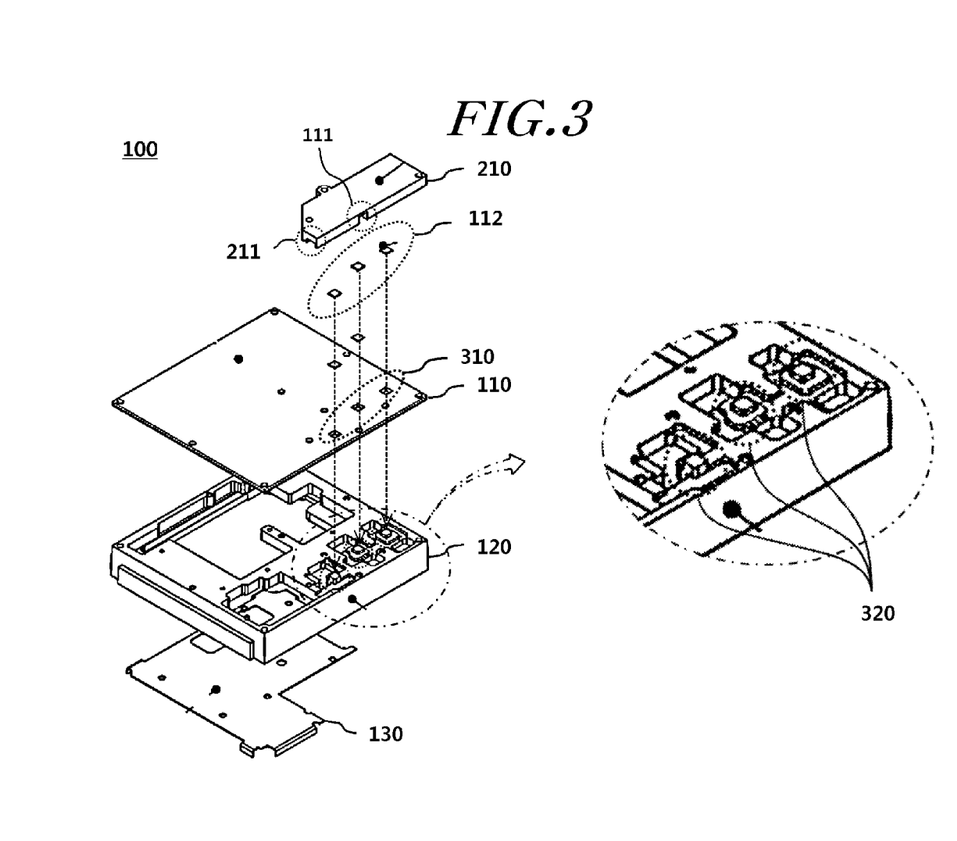
FIG. 3 is an exploded perspective view of the radar apparatus according to another exemplary embodiment of the present invention.

In practice, the radar apparatus 100 may be implemented as exemplified in the exploded perspective views of FIGS. 2 and 3.

Referring to FIGS. 2 and 3, the radar apparatus 100 of the present exemplary embodiment may further include a protective member 210 configured to cover the signal transmission/reception unit 112 mounted on the top side of the front end printed circuit board 110 and coupled to the front end printed circuit board 110 in order to protect the signal transmission/reception unit 112. The protective member 210 may be formed from a metallic material.

The protective member 210 may be formed with a groove 211 that serves as a passage of a wire for connecting the radar antenna unit 111 and the signal transmission/reception unit 112 mounted on the front end printed circuit board 110.

Meanwhile, the signal transmission/reception unit 112 is mounted on the top side of the front end printed circuit board 110, in which the position where the signal transmission/reception unit 112 is mounted may be the top side of the front end printed circuit board 110 as illustrated in FIG. 2, or the top side of the base plate 120 as illustrated in FIG. 3.

In other words, referring to FIG. 2, the signal transmission/reception unit 112 may be mounted on the top side of the front end printed circuit board 110 to be seated on the top side of front end printed circuit board 110 (see seated points 220 in FIG. 2).

In addition, referring to FIG. 3, the signal transmission/reception unit 112 may be mounted on the top side of the front end printed circuit board 110 and seated on the top side of the base plate 120 through holes 310 formed in the front end printed circuit board 110.

Referring to FIG. 3, when the signal transmission/reception unit 112 is seated on the base plate 120, protrusions 320 may be formed at points where the signal transmission/reception unit 112 is seated on the top side of the base plate 120 such that the signal transmission/reception unit 112 is seated and assembled thereto.

The top side of the front end printed circuit board 100 as described above will be described in more detail with reference to FIG. 4.

Figure 4:
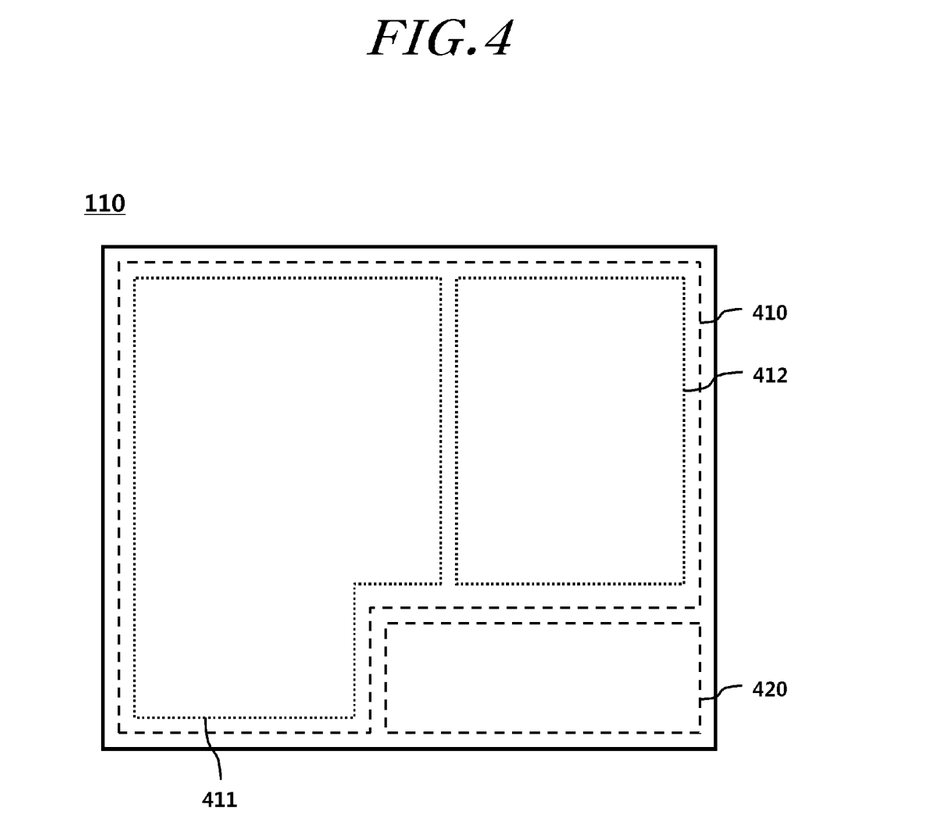
FIG. 4 exemplifies a front end printed circuit board in a radar apparatus according to another exemplary embodiment of the present invention.

FIG. 4 exemplifies the top side of the front end printed circuit board 110 in a radar apparatus according to an exemplary embodiment of the present invention.

Referring to FIG. 4, the top side of the front end printed circuit board 110 includes a radar antenna mounting part 410 where a radar antenna unit 111 is mounted, and a transmission/reception circuit mounting part 420 where the transmission/reception circuit unit 112 is mounted.

The radar antenna unit 111 may be divided into a transmission antenna unit and a reception antenna unit. Accordingly, the radar antenna mounting part 410 may be divided into a transmission antenna unit mounting part 411 and a reception antenna mounting part 412.

In connection with this, the radar antenna unit 111 mounted on the radar antenna mounting part 410 in the top side of the front end printed circuit board 110 may include a transmission antenna unit implemented by a plurality of long-distance transmission array antennas and one or more short-distance transmission array antennas, and a reception antenna unit implemented by a plurality of reception array antennas.

Each of the plurality of long-distance transmission array antennas may have the same length, or one or more long-distance transmission array antennas among the plurality of long-distance transmission array antennas may have a different length.

When one or more long-distance transmission array antennas among the plurality of long-distance transmission array antennas have a different length, there may be provided an antenna structure in which the long-distance transmission array antenna arranged at the center of the plurality of long-distance transmission array antennas has the longest length, and the lengths of the other transmission array antennas decrease as approaching the opposite sides thereof.

Meanwhile, the protective member 210 as described above should be sized not to cover the radar antenna mounting part.

Figure 5:
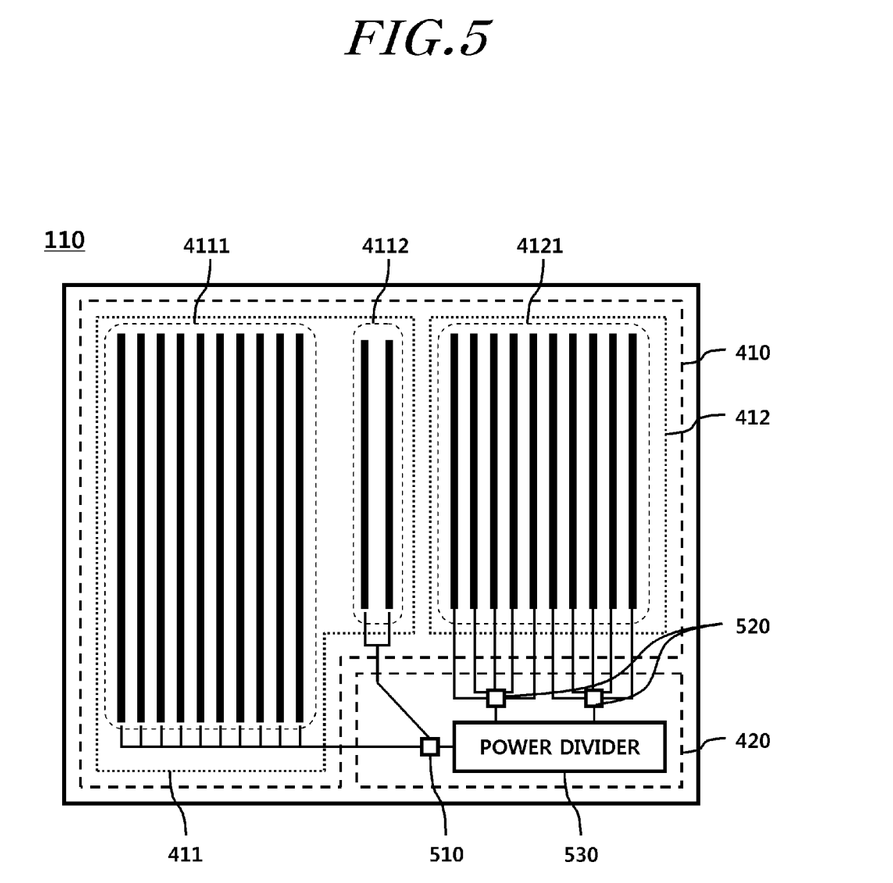
FIG. 5 exemplifies a front end printed circuit board, on which a radar antenna unit and a signal transmission/reception unit are mounted, in a radar apparatus according to another exemplary embodiment of the present invention.
Figure 6:
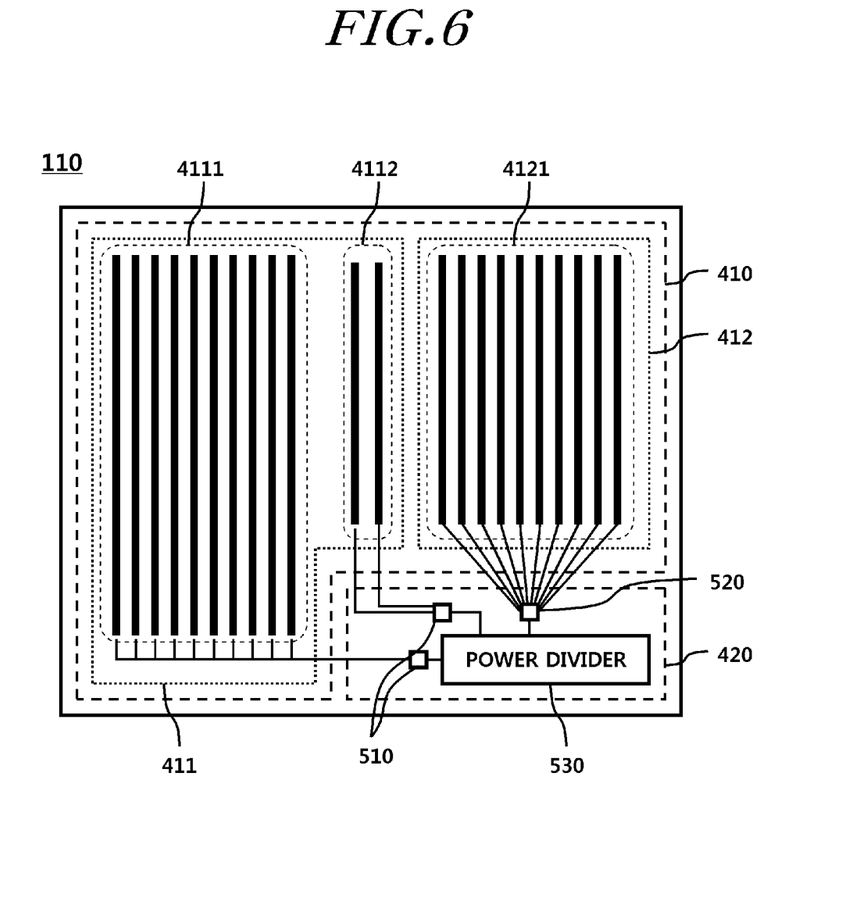
FIG. 6 exemplifies a front end printed circuit board, on which a radar antenna unit and a signal transmission/reception unit are mounted, in the radar apparatus according to another exemplary embodiment of the present invention.
Figure 7:
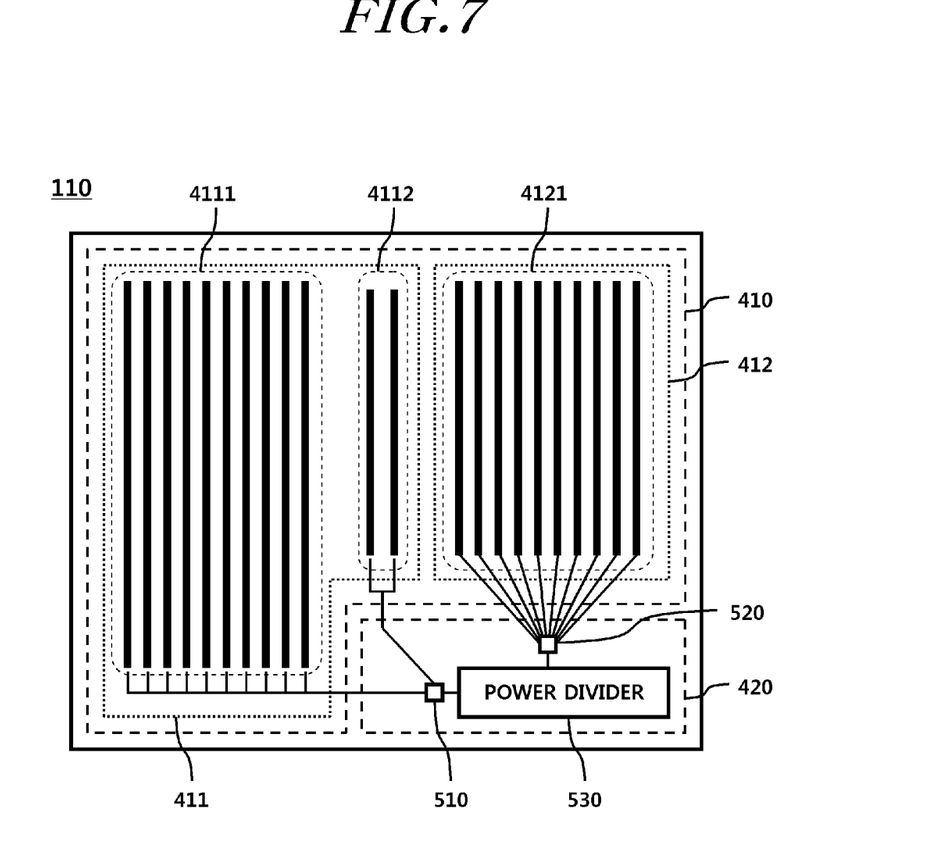
FIG. 7 exemplifies a front end printed circuit board, on which a radar antenna unit and a signal transmission/reception unit are mounted, in the radar apparatus according to another exemplary embodiment of the present invention.

FIGS. 5 to 7 illustrate examples in which the radar antenna unit 111 and the signal transmission/reception unit 112 are arranged on the top side of the front end printed circuit board 110 as illustrated in FIG. 4.

Referring to FIGS. 5 to 7, the radar antenna unit 111 may include a transmission antenna unit implemented by, for example, ten long-distance transmission array antennas 4111, and, for example, two short-distance transmission array antennas 4112, and a reception antenna unit implemented by, for example, ten reception array antennas 4121, in which the transmission antenna unit and the reception antenna unit are mounted on the radar antenna mounting part 410 in the top side of the front end printed circuit board 110.

As described above, the signal transmission/reception unit 112 mounted on transmission/reception circuit mounting part 420 in the top side of the front end printed circuit board 110 may be implemented as a circuit constituted by a plurality of circuit devices. However, the signal transmission/reception unit 112 may be implemented as a single or two or more integrated circuit chips in order to assure that the radar antenna unit 111 and the signal transmission/reception unit 112 are both arranged and mounted on the same plane of the front end printed circuit board 110.

If the signal transmission/reception unit 112 is implemented as a single or two or more integrated circuit chips, the signal transmission/reception unit 112 may be implemented as a single reception/transmission integrated circuit chip, or separatedly implemented as one or more transmission integrated circuit chips and one or more reception integrated circuit chips.

In FIG. 5, the signal transmission/reception unit 112 mounted on the transmission/reception circuit mounting part 420 in the top side of the front end printed circuit board 110 are separately implemented as one transmission integrated circuit chip 510 and two reception integrated circuit chips 520.

In FIG. 6, the signal transmission/reception unit 112 mounted on the transmission/reception circuit mounting part 420 in the top side of the front end printed circuit board 110 is separately implemented as two transmission integrated circuit chips 510 and a single reception integrated circuit chip 520.

In FIG. 7, the signal transmission/reception unit 112 mounted on the transmission/reception circuit mounting part 420 in the top side of the front end printed circuit board 110 is separately implemented as a single transmission integrated circuit chip 510 and a single reception integrated circuit chip 520.

Meanwhile, referring to FIGS. 5 to 7, the antenna apparatus 100 may further include a power divider 530 for dividing and supplying transmission power to output a bit signal from a received signal input from the reception array antennas 4121.

The power divider 530 may be controlled in such a manner that high power is supplied to the long-distance transmission array antenna arranged at the center of ten long-distance transmission array antennas 4111, and the power supplied to the other long-distance transmission array antennas is reduced as approaching the long-distance transmission array antennas arranged at the opposite sides in order to assure that the antenna gain is increased and the reduction of the SLL (side Love Level) is increased in the front side to be sensed.

Although FIGS. 5 to 7 illustrate that all the ten long-distance transmission array antennas 4111 have the same antenna length, the ten long-distance transmission array antennas 4111 may be designed in such a manner that the long-distance transmission array antenna arranged at the center of the ten long-distance transmission array antennas 4111 has the longest antenna length, and the lengths of the other long-distance transmission array antennas are reduced as approaching the long-distance transmission array antennas arranged at the opposite sides in order to assure that the antenna gain is increased and the reduction of the SLL (side Lobe Level) is increased in the front side to be sensed.

Meanwhile, referring to FIGS. 5 to 7, a transmission integrated circuit chip 510 connected to the ten long-distance transmission array antennas 4111, or connected to the ten long-distance transmission array antennas 4111 and the two short-distance transmission array antennas 4112 may include a switch to select the ten long-distance transmission array antennas 4111 and/or the two short-distance transmission array antennas 4112, or a circuit unit configured to turn ON/OFF a transmission/reception end, and a voltage controlled oscillator (VCO).

Meanwhile, referring to FIGS. 5 to 7, the one or more reception integrated circuit chips 520 connected with the ten reception array antennas 4121 may include a plurality of mixers and a plurality of low noise amplifiers (LNA).

As described above, according to the present invention, it is possible to provide a radar apparatus 100 having a front end structure which is reduced in size and the number of parts.

In addition, according to the present invention, it is possible to provide a radar apparatus having a front end structure that suppresses the deterioration of the yield and performance of the radar apparatus.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar apparatus comprising:
   a radar antenna unit including a transmission antenna unit and a reception antenna unit;
   a printed circuit board, on which a signal transmission/reception unit is mounted, the signal transmission/reception unit being configured to transmit a signal through the transmission antenna and to receive the transmitted signal through the reception antenna when the transmitted signal is reflected from surroundings;
   a base band circuit board mounted on a bottom side of the printed circuit board to perform a transmission/reception control and an analog to digital conversion;
   a signal processing printed circuit board on which a signal processing circuit unit is mounted; and
   a base plate having a top side coupled to the bottom side of the printed circuit board, and a bottom side coupled to a top side of the signal processing printed circuit board,
   wherein the radar antenna unit and the signal transmission/reception unit are both arranged and mounted on a top side of the printed circuit board.

2. The radar apparatus of claim 1, wherein the radar antenna unit and the signal transmission/reception unit are both arranged on the top side of the printed circuit board and connected with each other through a micro-strip line or by wire-bonding.

3. The radar apparatus of claim 1, wherein the signal transmission/reception unit mounted on the top side of the printed circuit board is implemented as a single reception/transmission integrated circuit chip.

4. The radar apparatus of claim 1, wherein the signal transmission/reception unit mounted on the top side of the printed circuit board is separately implemented as one or more transmission integrated circuit chips and one or more reception integrated circuit chips.

5. The radar apparatus of claim 1, further comprising a protective member configured to cover the signal transmission/reception unit and coupled to the printed circuit board to protect the signal transmission/reception unit mounted on the top side of the printed circuit board.

6. The radar apparatus of claim 5, wherein the protective member is formed with a groove that serves as a passage of a micro-strip line or a wire for connecting the radar antenna unit and the signal transmission/reception unit mounted on the printed circuit board.

7. The radar apparatus of claim 5, wherein the top side of the printed circuit board comprises a radar antenna mounting part where the radar antenna unit is mounted, and a transmission/reception circuit mounting part where the transmission/reception circuit unit is mounted, and
   wherein the protective member is sized not to cover the radar antenna mounting part.

8. The radar apparatus of claim 1, wherein the signal transmission/reception unit is mounted on the top side of the printed circuit board and seated on the top side of the printed circuit board, or mounted on the top side of the printed circuit board and seated on the top side of the base plate through one or more holes formed in the printed circuit board.

9. The radar apparatus of claim 8, wherein the base plate is formed with one or more protrusions on the top side thereof to allow the signal transmission/reception unit to be seated on and assembled to the base plate when the signal transmission/reception unit is seated on the top side of the base plate.

10. The radar apparatus of claim 1, wherein the transmission antenna unit includes a plurality of transmission antennas and one or more short-distance transmission antennas, and the reception antenna unit includes a plurality of reception antennas.

11. The radar apparatus of claim 1, further comprising a power divider that is controlled to supply high power to a long-distance transmission antenna arranged at the center of a plurality of transmission antennas of the transmission antenna unit, and supply power to other long-distance transmission antennas in such a manner that the power is reduced approaching the long-distance transmission antennas of opposite sides.

* * * * *